United States Patent Office 2,694,689
Patented Nov. 16, 1954

2,694,689

VINYL HALIDE POLYMERS PLASTICIZED WITH DIALKYL MONOARYL PHOSPHATES

Harry R. Gamrath and Roger E. Hatton, St. Louis, Mo., assignors to Monsanto Chemical Company, St. Louis, Mo., a corporation of Delaware No Drawing. Application November 27, 1950, Serial No. 197,843

11 Claims. (Cl. 260—30.6)

This invention relates to plasticized vinyl halide polymers; more specifically, this invention relates to vinyl halide-containing polymers plasticized with certain dialkyl monoaryl phosphate esters.

Plasticized vinyl halide-containing polymers, particularly vinyl chloride-containing polymers, have enjoyed wide spread utility in a number of applications. Each particular application of such a composition necessitates a plasticized vinyl halide-containing polymer having a particularly defined set of physical properties. In many applications three of the most significant properties of the plasticized resinous composition which must be considered are its flexibility at low temperatures, plasticizer volatility and solvent extractability of the plasticizer. This is particularly true in the preparation of thin sheeting which may be used in applications wherein it will be subjected to a wide temperature range and contact with materials which exhibit a solvent action towards a plasticizer. A particular instance of such an application is in the use of such resinous films as food packaging material. In such applications it is essential that the plasticized vinyl halide polymeric composition be extremely flexible at exceptionally low temperatures, that the plasticizers have little tendency to be lost through volatilization at elevated temperatures, and that contact with various types of solvents or materials which exhibit a solvent action extract negligible quantities of the plasticizer from the resinous composition.

It is an object of this invention to provide improved plasticized vinyl halide-containing polymers. Further objects will become apparent from the description of this invention which follows.

While certain types of esters of ortho-phosphoric acid have been utilized as plasticizers for vinyl halide-containing polymeric compositions, it has now been found that plasticized polymeric vinyl halide-containing compositions having surprisingly and significantly improved physical properties may be prepared utilizing certain phosphate esters which heretofore had not been employed in such an application. According to this invention, therefore, improved resinous compositions are prepared comprising a vinyl halide-containing polymer and a dialkyl monoaryl phosphate ester having the formula

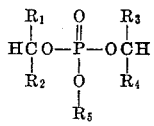

wherein $R_1$ and $R_2$ each represents hydrogen or an alkyl radical wherein the number of the carbon atoms in $R_1$ and $R_2$ together does not exceed 19, $R_3$ and $R_4$ each represents hydrogen or an alkyl radical wherein the number of carbon atoms in $R_3$ and $R_4$ together does not exceed 19 carbon atoms, and wherein the number of carbon atoms in $R_1$, $R_2$, $R_3$ and $R_4$ together is at least 7, and $R_5$ represents an aryl radical.

Illustrative, but not limitative, of various ortho-phosphate esters which may be used in the novel compositions of this invention are the following:

| Phosphate Ester | Sp. Gr. at 25°/25° C. | $N_D^{25}$ |
|---|---|---|
| 2-Ethylhexyl methyl phenyl phosphate | 1.0613 | 1.4802 |
| 2-Ethylhexyl sec-butyl p-chlorophenyl phosphate | 1.0961 | 1.4843 |
| n-Octyl n-butyl phenyl phosphate | 1.0569 | 1.4663 |
| 2-Ethylhexyl isobutyl phenyl phosphate | 1.0241 | 1.4720 |
| 2-Ethylhexyl n-butyl phenyl phosphate | 1.0212 | 1.4698 |
| 2-Ethylhexyl sec-butyl cresyl phosphate | 1.0158 | 1.4748 |
| 2-Ethylhexyl n-butyl cresyl phosphate | 1.0110 | 1.4719 |
| Di(2-ethylhexyl) phenyl phosphate | 0.9928 | 1.4696 |
| 2-Ethylhexyl capryl phenyl phosphate | 0.9876 | 1.4687 |
| 2-Ethylhexyl 2-butyloctyl cresyl phosphate | 0.9613 | 1.4690 |
| n-Butyl sec-tetradecyl phenyl phosphate | 0.9316 | 1.4588 |
| n-Hexadecyl isopropyl phenyl phosphate | 0.9422 | 1.4633 |

The novel improved plasticized polymeric vinyl halide-containing compositions of this invention are illustrated in the following examples wherein all parts are by weight unless otherwise specified:

Example 1

A mixture of 60 parts of polyvinyl chloride and 40 parts of di(2-ethylhexyl) phenyl phosphate is milled on a differential roll mill maintained at a temperature of 325° F. for a period of approximately five minutes, whereupon a homogeneous plasticized polyvinyl chloride composition is formed. The resulting composition is pressed into the form of a sheet in a suitable mold under a pressure of approximately 4,000 pounds per square inch and at a temperature of 325° F.

The plasticized polyvinyl chloride sheet thus obtained is transparent and quite flexible, both at room temperature and at extremely low temperatures. The composition thus obtained possesses a low temperature flexibility of −53° C. when determined in accordance with the method of Clash and Berg, as described in Ind. Eng. Chem. 34, 1218 (1942), a method well known to those skilled in the art of the evaluation of polyvinyl chloride compositions.

The enhanced low temperature flexibility of the novel composition as prepared above is made clearly evident when compared with the low temperature flexibility of similar compositions wherein the di(2-ethylhexyl) phenyl phosphate utilized above is replaced with other phosphate esters. The low temperature flexibility of such compositions is illustrated in the following table wherein Column A sets forth the phosphate esters utilized in place of the di(2-ethylhexyl) phenyl phosphate in the above described composition, and column B sets forth the low temperature flexibility of such a composition:

| Column A<br>Plasticizer | Column B<br>Low Temperature Flexibility, ° C. |
|---|---|
| Tricresyl phosphate | −10 |
| Cresyl diphenyl phosphate | −17 |
| Octyl diphenyl phosphate | −37 |
| Octyl dicresyl phosphate | −33 |

A sample of the above prepared plasticized polyvinyl chloride composition containing 40% by weight of di-(2-ethylhexyl) phenyl phosphate is heated to a temperature of 105° C. for 24 hours in a Freas circulating air oven. After such a heat treatment it is found that only 6.3% of the plasticizer is lost through volatilization. A similar composition plasticized with tri(2-ethylhexyl) phosphate in place of di(2-ethylhexyl) phenyl phosphate loses 7.9% of its plasticizer through volatilization after a similar heating period.

Example II

In accordance with the procedure described in Example I, compositions are prepared utilizing 35 parts of di(2-ethylhexyl) phenyl phosphate and 65 parts of polyvinyl chloride. In order to determine the extractability of the plasticizer on contact with various types of solvents, the composition above prepared is subjected to the action of Mazola oil and kerosene in accordance with ASTM Method Numbers D744–44T and D543–43. It is found that 8.4% of the plasticizer is extracted by Mazola oil and 11% by kerosene whereas a composition containing tri(2-ethylhexyl) phosphate in place of the di(2-ethylhexyl) phenyl phosphate lost 16.0% of the plasticizer in Mazola oil and 65% of the plasticizer in kerosene.

Example III

In accordance with the procedure described in Example I, a plasticized polyvinyl chloride composition is prepared utilizing in place of the di(2-ethylhexyl) phenyl phosphate, 40 parts of 2-ethylhexyl n-butyl phenyl phosphate. A clear, transparent, highly flexible composition is obtained having a low temperature flexibility of −50° C.

Example IV

In accordance with the procedure described in Example I, a plasticized polyvinyl chloride composition is prepared utilizing in place of the di(2-ethylhexyl) phenyl phosphate, 40 parts of 2-ethylhexyl capryl phenyl phosphate, whereby a clear, transparent, highly flexible composition is obtained having a low temperature flexibility of −47° C.

Example V

Utilizing the procedure described in Example I, a highly flexible, clear, transparent polyvinyl chloride composition is prepared utilizing 60 parts of polyvinyl chloride and 40 parts of 2-ethylhexyl sec-butyl cresyl phosphate. The composition has a low temperature flexibility of −44° C.

Example VI

The procedure set forth in Example I is repeated with the exception of utilizing in place of the polyvinyl chloride, a copolymer of 90 parts of vinyl chloride and 10 parts vinyl acetate. The resultant resinous composition has properties quite similar to those obtained in Example I.

Example VII

The procedure set forth in Example I is repeated utilizing in place of the polyvinyl chloride, a copolymer of 90 parts of vinyl chloride and 10 parts of vinylidene chloride. A clear, tough, transparent resinous sheet is obtained characterized by exceptionally good flexibility.

Example VIII

The procedure set forth in Example I is repeated except that the polyvinyl chloride is replaced by a copolymer of 90 parts of vinyl chloride and 10 parts of diethyl maleate. The resinous composition thus obtained is extremely flexible at low temperatures.

Example IX

The procedure set forth in Example I is repeated utilizing in place of the 40 parts of di(2-ethylhexyl) phenyl phosphate, a mixture containing 20 parts of di(2-ethylhexyl) phenyl phosphate and 20 parts of di(2-ethylhexyl) phthalate. The resultant composition is clear, tough and extremely flexible at low temperatures.

Example X

In accordance with the procedure described in Example I, a clear, tough, extremely permanent and extremely flexible composition is prepared utilizing 60 parts of polyvinyl chloride and 40 parts of 2-ethylhexyl sec-butyl p-chlorophenyl phosphate.

Example XI

In accordance with the procedure described in Example I, a clear, tough and extremely flexible composition is prepared using 70 parts of polyvinyl chloride and 30 parts of 2-ethylhexyl 2-butyloctyl cresyl phosphate.

Example XII

Utilizing the procedure described in Example I, an extremely flexible polyvinyl chloride composition, particularly flexible at low temperatures, is prepared utilizing 40 parts of dicapryl phenyl phosphate and 60 parts polyvinyl chloride.

While the preceding examples have illustrated specific embodiments of the novel compositions of this invention, it will be obvious to those skilled in the art that substantial variation in these examples is possible without departing from the scope of this invention. For example, while those phosphate esters wherein the alkyl substituents are unsubstituted constitute a preferred embodiment of this invention, the alkyl radicals may be substituted with one or more unreactive substituents. Thus, the alkyl radical may be substituted with nitro groups, aryl groups, such as phenyl, alkoxy groups, such as ethoxy, butoxy, isopropoxy, etc., halogens, such as chlorine, bromine and iodine and fluorine. In a similar manner, the aryl group may be unsubstituted or it may be substituted with one or more inert substituents.

While the preceding examples also illustrated particular compositions comprising a vinyl chloride-containing resin and a dialkyl monoaryl phosphate ester, it is also obvious that substantial variation is possible in the preparation and composition of such resinous compositions. The quantity of the dialkyl monoaryl phosphate ester utilized in such a composition may vary over a wide range, depending upon the properties desired. A dialkyl monoaryl phosphate ester content of as low as about 5 parts by weight per 100 parts of the vinyl chloride-containing polymer and as high as 300 parts by weight of the dialkyl monoaryl phosphate ester for 100 parts of the vinyl chloride-containing polymer, has been found to be useful in preparing improved plasticized synthetic resinous compositions. Furthermore, the dialkyl monoaryl phosphate ester may be utilized as the sole plasticizer for the vinyl chloride-containing polymer or it may be used in combination with one or more of the commonly used plasticizers for vinyl chloride-containing polymers, thereby obtaining a composition having physical properties attributable to, or resulting from, each of the plasticizer components. Typical of such plasticizers which may be utilized in combination with these dialkyl monoaryl phosphate esters are di(2-ethylhexyl) phthalate, dibutyl phthalate, tricresyl phosphate, alkyl diaryl phosphates, tri(2-ethylhexyl) phosphate, dibutyl sebacate, dioctyl adipate, alkyl benzyl phthalates, etc.

The novel synthetic resinous compositions of this invention may also have incorporated therein various pigments, fillers, stabilizers, both heat and light, etc.

As indicated by the examples, copolymers of vinyl chloride and other unsaturated materials copolymerizable therewith may be plasticized with the dialkyl monoaryl phosphate esters in accordance with this invention. For example, copolymers of vinyl chloride with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, ortho-chlorostyrene, para-cholorostyrene, 2,5-dichlorostyrene, 2,4-dichlorostyrene, para-ethyl styrene, divinyl benzene, vinyl naphthanate, alpha-methyl styrene, dienes, such as butadiene, chloroprene; amides, such as acrylic acide amide, acrylic acid anilide; nitriles, such as acrylic acid nitrile; esters of alpha, beta-unsaturated carboxylic acids, for example, the methyl, ethyl, propyl, butyl, amyl, hexyl, heptyl, octyl, allyl, methallayl, and phenyl esters of maleic, crotonic, itaconic, fumaric acids and the like. The class of polymers in which a predominant portion, i. e., more than 50% by weight, of the copolymer is made from vinyl chloride, represents a preferred class of polymers to be treated according to the invention.

A particularly preferred embodiment of the invention comprises compositions comprised of a dialkyl monoaryl phosphate ester of this invention and a polymer prepared by copolymerizing vinyl chloride and an ester of an alpha, beta-unsaturated dicarboxylic acid, such as diethyl maleate, in which 5 to 30 parts by weight of diethyl maleate are utilized for every 95 to 70 parts by weight of vinyl chloride. Among the preferred esters of alpha, beta-unsaturated dicarboxylic acids are the alkyl esters in which the alkyl group contains from 1 to 8 carbon atoms.

In addition to the above described vinyl chloride-containing polymers, similar polymers wherein the vinyl chloride is replaced, either in whole or in part, by other vinyl halides may be utilized. Typical of such other vinyl halides are vinyl bromide, vinyl fluoride, etc.

While the novel stabilized dialkyl monoaryl phosphate esters of this invention are particularly useful as plasticizers for vinyl halide-containing polymers, they may also be used as modifiers for cellulose nitrate surface coatings and, because of their stability and relatively high flash points, as functional fluids, particularly as hydraulic fluids.

What is claimed is:

1. A composition comprising a vinyl halide polymer and a dialkyl monoaryl phosphate ester having the formula

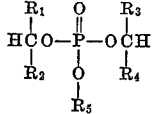

wherein $R_1$ and $R_2$ each are selected from the group consisting of hydrogen and an alkyl radical wherein the number of the carbon atoms in $R_1$ and $R_2$ together does not exceed 19, $R_3$ and $R_4$ each are selected from the group consisting of hydrogen and an alkyl radical wherein the number of carbon atoms in $R_3$ and $R_4$ together does not exceed 19 carbon atoms, and wherein the number of carbon atoms in $R_1$, $R_2$, $R_3$ and $R_4$ together is at least 7, and $R_5$ represents an aryl radical which is selected from the group consisting of phenyl and cresyl.

2. A composition comprising a vinyl chloride polymer and a dialkyl monoaryl phosphate ester having the formula

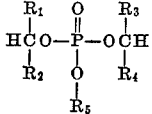

wherein $R_1$ and $R_2$ each are selected from the group consisting of hydrogen and an alkyl radical wherein the number of the carbon atoms in $R_1$ and $R_2$ together does not exceed 19, $R_3$ and $R_4$ each are selected from the group consisting of hydrogen and an alkyl radical wherein the number of carbon atoms in $R_3$ and $R_4$ together does not exceed 19 carbon atoms, and wherein the number of carbon atoms in $R_1$, $R_2$, $R_3$ and $R_4$ together is at least 7, and $R_5$ represents an aryl radical which is selected from the group consisting of phenyl and cresyl.

3. A composition comprising a copolymer of vinyl chloride and a dialkyl ester of an alpha, beta-unsaturated dicarboxylic acid and a dialkyl monoaryl phosphate ester having the formula

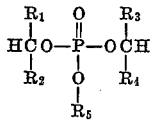

wherein $R_1$ and $R_2$ each are selected from the group consisting of hydrogen and an alkyl radical wherein the number of the carbon atoms in $R_1$ and $R_2$ together does not exceed 19, $R_3$ and $R_4$ each are selected from the group consisting of hydrogen and an alkyl radical wherein the number of carbon atoms in $R_3$ and $R_4$ together does not exceed 19 carbon atoms, and wherein the number of carbon atoms in $R_1$, $R_2$, $R_3$ and $R_4$ together is at least 7, and $R_5$ represents an aryl radical which is selected from the group consisting of phenyl and cresyl.

4. A composition comprising a copolymer of vinyl chloride and vinyl acetate and a dialkyl monoaryl phosphate ester having the formula

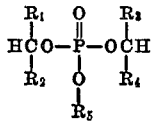

wherein $R_1$ and $R_2$ each are selected from the group consisting of hydrogen and an alkyl radical wherein the number of the carbon atoms in $R_1$ and $R_2$ together does not exceed 19, $R_3$ and $R_4$ each are selected from the group consisting of hydrogen and an alkyl radical wherein the number of carbon atoms in $R_3$ and $R_4$ together does not exceed 19 carbon atoms, and wherein the number of carbon atoms in $R_1$, $R_2$, $R_3$ and $R_4$ together is at least 7, and $R_5$ represents an aryl radical which is selected from the group consisting of phenyl and cresyl.

5. A composition comprising a copolymer of vinyl chloride and diethyl maleate and a dialkyl monoaryl phosphate ester having the formula

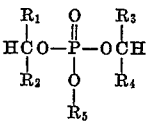

wherein $R_1$ and $R_2$ each are selected from the group consisting of hydrogen and an alkyl radical wherein the number of carbon atoms in $R_1$ and $R_2$ together does not exceed 19, $R_3$ and $R_4$ each are selected from the group consisting of hydrogen and an alkyl radical wherein the number of carbon atoms in $R_3$ and $R_4$ together does not exceed 19 carbon atoms, and wherein the number of carbon atoms in $R_1$, $R_2$, $R_3$ and $R_4$ together is at least 7, and $R_5$ represents an aryl radical which is selected from the group consisting of phenyl and cresyl.

6. A composition comprising polyvinyl chloride and a dialkyl monoaryl phosphate ester having the formula

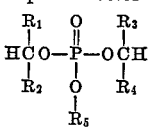

wherein $R_1$ and $R_2$ each are selected from the group consisting of hydrogen and an alkyl radical wherein the number of the carbon atoms in $R_1$ and $R_2$ together does not exceed 19, $R_3$ and $R_4$ are each selected from the group consisting of hydrogen and an alkyl radical wherein the number of carbon atoms in $R_3$ and $R_4$ together does not exceed 19 carbon atoms, and wherein the number of carbon atoms in $R_1$, $R_2$, $R_3$ and $R_4$ together is at least 7, and $R_5$ represents an aryl radical which is selected from the group consisting of phenyl and cresyl.

7. A composition comprising polyvinyl chloride and di(2-ethylhexyl) phenyl phosphate.

8. A composition comprising polyvinyl chloride and 2-ethylhexyl capryl phenyl phosphate.

9. A composition comprising polyvinyl chloride and 2-ethylhexyl n-butyl phenyl phosphate.

10. A composition comprising polyvinyl chloride and 2-ethylhexyl sec-butyl cresyl phosphate.

11. A composition comprising polyvinyl chloride and n-octyl n-butyl phenyl phosphate.

References Cited in the file of this patent

UNITED STATES PATENTS

| Number | Name | Date |
|---|---|---|
| 2,168,587 | Shuman | Aug. 8, 1939 |

OTHER REFERENCES

"Vinylite Resins—Their Forms, Properties and Uses," Carbide and Carbon Co., New York, 1946, page 4.